United States Patent
Martins et al.

(10) Patent No.: US 8,186,159 B2
(45) Date of Patent: May 29, 2012

(54) INTAKE AIR COOLER FOR DUAL-STATE TURBOCHARGING TURBOCOMPRESSED HEAT ENGINE AND CORRESPONDING AIR CIRCUIT

(75) Inventors: Carlos Martins, Le Chesnay (FR); Michel Potier, Rambouillet (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 977 days.

(21) Appl. No.: 11/915,811

(22) PCT Filed: May 24, 2006

(86) PCT No.: PCT/FR2006/001191
§ 371 (c)(1),
(2), (4) Date: Jul. 25, 2008

(87) PCT Pub. No.: WO2006/128995
PCT Pub. Date: Dec. 7, 2006

(65) Prior Publication Data
US 2009/0084364 A1    Apr. 2, 2009

(30) Foreign Application Priority Data
May 31, 2005 (FR) ...................... 05 05469

(51) Int. Cl.
| F02B 33/44 | (2006.01) |
| F02B 33/00 | (2006.01) |
| F02B 29/04 | (2006.01) |
| F28F 27/02 | (2006.01) |
| F28F 9/02 | (2006.01) |
| F28F 9/26 | (2006.01) |
| F28F 9/22 | (2006.01) |

(52) U.S. Cl. .......... 60/612; 123/562; 123/563; 165/110; 165/143; 165/145; 165/174

(58) Field of Classification Search ............... 60/612, 60/599; 123/562, 563; 165/110, 143, 145, 165/163, 174; *F02B 29/04, 37/00*
See application file for complete search history.

(56) References Cited

U.S. PATENT DOCUMENTS

| 1,841,528 | A | * | 1/1932 | Gebhardt | ..................... 165/174 |
| 3,001,692 | A | * | 9/1961 | Schierl | ............................. 415/66 |
| 4,236,492 | A |   | 12/1980 | Tholen | ............................ 123/563 |
| 4,258,550 | A | * | 3/1981 | Hinkle et al. | ................... 60/599 |
| 4,899,814 | A | * | 2/1990 | Price | ............................. 165/163 |

(Continued)

FOREIGN PATENT DOCUMENTS
DE        10309808 A1    10/2003
(Continued)

OTHER PUBLICATIONS

A Fully Certified English Translation Michel Potier et al. (Pub. No. FR 2843449 A1), published on Feb. 13, 2004.*

(Continued)

*Primary Examiner* — Thai Ba Trieu
(74) *Attorney, Agent, or Firm* — Howard & Howard Attorneys PLLC (57) ABSTRACT

The intake air cooler of the invention comprises a first cooling stage (24) and a second cooling stage (26) grouped in a single heat exchanger housing (30) and sharing a common heat exchanger bundle (28) accommodated in the housing and traversed by a cooling liquid. Application to turbocharged internal combustion engines for motor vehicles.

21 Claims, 5 Drawing Sheets

U.S. PATENT DOCUMENTS

| | | | |
|---|---|---|---|
| 5,442,904 A * | 8/1995 | Shnaid | 60/783 |
| 5,771,963 A * | 6/1998 | Blangetti et al. | 165/143 |
| 6,516,873 B1 * | 2/2003 | Haugen | 165/145 |
| 6,910,469 B2 * | 6/2005 | Renkonen | 123/563 |
| 6,948,558 B2 * | 9/2005 | Maisotsenko et al. | 165/110 |
| 2003/0115876 A1 | 6/2003 | Shaffer | 60/612 |
| 2005/0034712 A1* | 2/2005 | Guerrero | 123/540 |
| 2010/0139268 A1* | 6/2010 | Huber et al. | 60/612 |

FOREIGN PATENT DOCUMENTS

| | | |
|---|---|---|
| EP | 714009 A1 * | 5/1996 |
| EP | 1775440 A1 * | 4/2007 |
| FR | 2372961 | 6/1978 |
| FR | 2843449 A1 | 2/2004 |
| JP | 09013974 A * | 1/1997 |
| JP | 2002309944 A * | 10/2002 |
| JP | 2006189181 A * | 7/2006 |
| JP | 2007291915 A * | 11/2007 |
| JP | 2007309172 A * | 11/2007 |
| JP | 2007315231 A * | 12/2007 |
| WO | WO 2007035972 A2 * | 4/2007 |

OTHER PUBLICATIONS

A Fully Certified English Translation Roithinger Robert (Pub. No. DE 103 09 808 A1), published on Apr. 25, 2003.*

A Machine Translation of (Pub. No. FR 2 117158 A5), published on Jun. 26, 1972.*

English language abstract for DE 10309808 extracted from espacenet.com, Jul. 11, 2008.

English language abstract for FR 2843449 extracted from espacenet.com, Jul. 11, 2008.

English language abstract for FR 2372961 extracted from espacenet.com, Jul. 11, 2008.

* cited by examiner

INTAKE AIR COOLER FOR DUAL-STATE TURBOCHARGING TURBOCOMPRESSED HEAT ENGINE AND CORRESPONDING AIR CIRCUIT

RELATED APPLICATIONS

This application claims priority to and all the advantages of International Patent Application No. PCT/FR2006/001191, filed on May 24, 2006, which claims priority to French Application No. FR 0505469, filed on May 31, 2005.

BACKGROUND

The invention relates to equipment of internal combustion engines of motor vehicles.

It relates in particular to an intake air cooler for a dual-stage turbocharged internal combustion engine, and to an intake air circuit comprising such a cooler.

To improve the performance of internal combustion engines, particularly at low speed, the use of two turbocharging stages respectively comprising a first compressor and a second compressor is known. The first compressor, or upstream compressor, compresses the intake air to low pressure, while the second compressor, or downstream compressor, compresses the intake air to high pressure. The two turbocharging stages may comprise a turbocharger associated with a mechanical or electric compressor, or two turbochargers having different sizes and compression ratios.

The intake air thereby compressed, also called turbocharging air, is heated by its compression and must be cooled using an appropriate heat exchanger, called turbocharging air cooler.

In the case of a dual-stage turbocharged internal combustion engine, the air heated by compression may be cooled by a single heat exchanger, or by two heat exchangers mounted at the outlet of each compressor, when the latter are mounted in series. This known architecture improves the efficiency and protects the drive impeller of the second compressor when the outlet temperature of the first compressor is too high.

The use of two heat exchangers not only incurs an additional cost, but also penalizes the aeraulics, particularly since the heat exchangers are generally mounted at the front of the vehicle.

SUMMARY

It is a particular object of the invention to overcome the above drawbacks.

For this purpose, it proposes an intake air cooler of the type previously defined, which comprises a first cooling stage and a second cooling stage grouped together in a single heat exchanger housing and sharing a common heat exchanger bundle, accommodated in the heat exchanger housing and traversed by a cooling liquid.

Thus, the invention serves to group the two cooling stages in a single housing, while sharing the same heat exchanger bundle, said housing being traversed by intake air, the turbocharging air flowing in particular in series.

This solution has a number of advantages, particularly lower cost, lower pressure drop across the intake air line and smaller size. It is also compatible with operation with two compressors or a single compressor.

In a preferred embodiment, the first cooling stage and the second cooling stage respectively comprise a first conduit and a second conduit separated by a partition and each having an inlet and an outlet for the intake air, the heat exchanger bundle comprising a first part and a second part accommodated respectively in the first conduit and the second conduit.

In one embodiment, the inlet and the outlet of the first conduit are respectively opposite the inlet and the outlet of the second conduit so that the intake air flows therein in opposite directions, while the heat exchanger bundle is arranged so that the cooling liquid flows in succession in the first part and the second part of the heat exchanger bundle.

In another embodiment, the inlet and the outlet of the first conduit are respectively on the same side as the inlet and the outlet of the second conduit, so that the intake air flows therein in the same direction, while the heat exchanger bundle is arranged so that the cooling liquid flows simultaneously in the first part and the second part of the heat exchanger bundle.

In all cases, it is advantageous for the heat exchanger bundle to be arranged so that the cooling liquid flows in the opposite direction to the intake air both in the first part and in the second part of the heat exchanger bundle.

Advantageously, the heat exchanger bundle comprises a stack of plates and corrugated inserts bounding cooling liquid flow streams alternating with intake air flow channels.

To improve the heat exchange, the cooling liquid flow streams, each formed between two contiguous plates, advantageously bound a flow path having at least one U-shape.

According to another feature of the invention, the abovementioned partition may be formed by the housing and/or the bundle.

In a first alternative, the partition is a fixed partition.

In a second alternative, the partition comprises a fixed part and at least one mobile part movable between a first position in which the first conduit and the second conduit are isolated and a second position in which the first conduit and the second conduit communicate.

In one embodiment, the respective air inlets of the first conduit and the second conduit are placed at opposite ends of the heat exchanger housing, while the partition comprises a single mobile part located at one of the ends of the heat exchanger housing.

In another embodiment, the respective air inlets of the first conduit and the second conduit are placed at the same end of the heat exchanger housing, while the partition comprises two mobile parts located respectively at the two ends of the heat exchanger housing.

The mobile part is advantageously a pivoting flap.

According to another aspect, the invention relates to an intake air circuit for a dual-stage turbocharged internal combustion engine comprising an upstream compressor, operating at low pressure, and a downstream compressor, operating at high pressure, said circuit further comprising an intake cooler according to the invention.

In this case, the first cooling stage is inserted between the upstream compressor and the downstream compressor, while the second cooling stage is connected at the outlet of the downstream compressor.

In the case in which the intake air cooler is equipped with a partition having at least one mobile part, the circuit may allow for two positions corresponding to the positions of this mobile part.

In the first abovementioned position, the intake air is capable of passing in succession through the upstream compressor, the first cooling stage, the downstream compressor, then the second cooling stage. In this case, both compressors are used.

In the second abovementioned position, the intake air is capable of passing in succession through the upstream compressor, the first cooling stage, then the second cooling stage, thereby circumventing the downstream compressor.

In other words, only the upstream compressor is used in this case.

In the following description, provided only as an example, reference can be made to the drawings appended hereto in which.

BRIEF DESCRIPTION OF THE DRAWINGS

DETAILED DESCRIPTION

Figure 1:
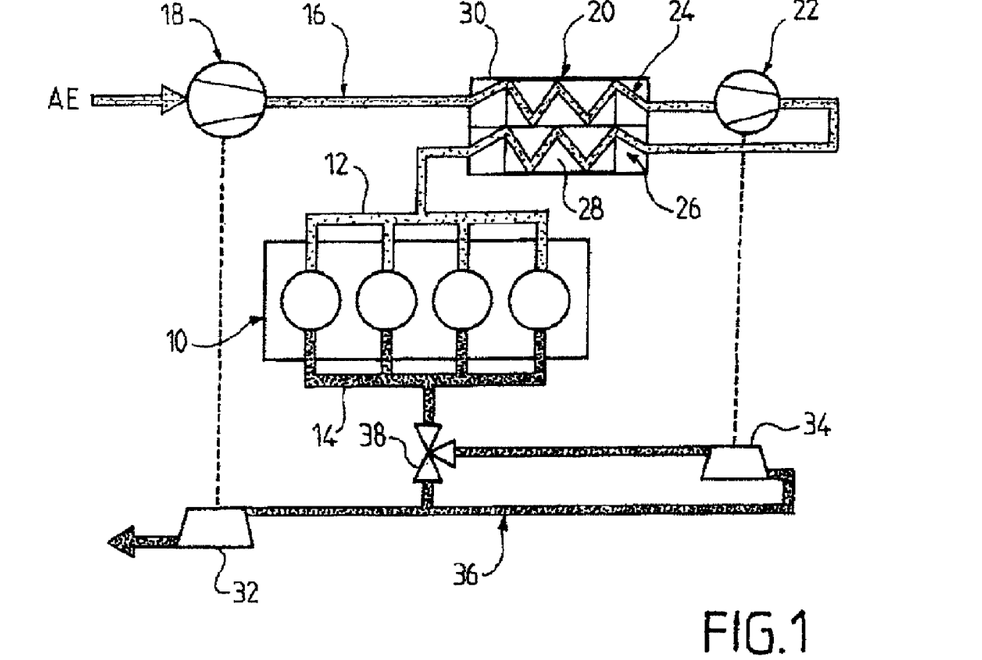
FIG. 1 schematically shows an internal combustion engine whereof the intake air circuit comprises an intake air cooler according to the invention.

Reference should first be made to FIG. 1 which shows an internal combustion engine 10, for example a motor vehicle engine, comprising an intake manifold 12 and an exhaust manifold 14. The intake manifold 12 is fed by an intake air circuit 16, also called intake line, with external air AE. This circuit 16 comprises an upstream compressor 18, an intake air cooler 20 (also called "cooler" for simplification) and a downstream compressor 22.

The cooler 20 comprises a first cooling stage 24 and a second cooling stage 26 sharing a common heat exchanger bundle 28, the assembly being grouped in a single housing 30, the two cooling stages 24 and 26 being traversed by external and/or intake air.

The compressors 18 and 22 have respective turbines 32 and 34 placed in an exhaust circuit 36 issuing from the exhaust manifold 14 and capable of being driven by the exhaust gases issuing from the engine. A three-way valve 38 is integrated in the circuit 36. In a first position, the valve sends the exhaust gases to the turbine 34 and from there, to the turbine 32, to drive the two compressors 18 and 22. In a second position, it sends the exhaust gases directly to the turbine 32 to drive the compressor 18 only.

In the first position, the external air AE at atmospheric pressure is compressed to low pressure by the upstream compressor 18, and then cooled in the first stage 24 of the cooler, is compressed to high pressure by the compressor 22, and is cooled in the second stage 26 of the cooler and sent to the intake manifold 12. In the second position, the external air is compressed to low pressure by the compressor 18 and is cooled in succession by the first stage 24 and the second stage 26 of the cooler and sent to the intake manifold 12, thereby circumventing the downstream compressor 22. As shown below, the cooler 20 comprises communicating means for isolating the stages 24 and 26 or, on the contrary, for making them communicate.

Thus, in the two positions, the air flow in the intake air circuit and the cooler takes place in series.

Figure 2:
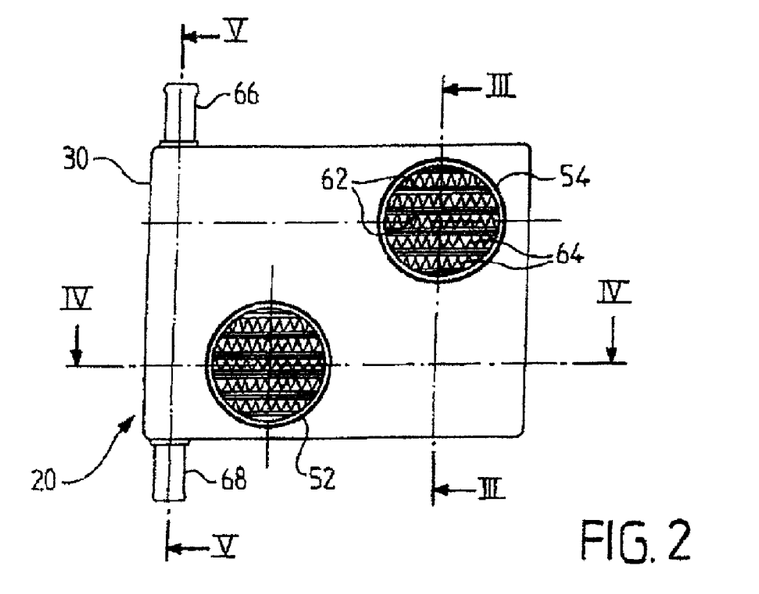
FIG. 2 is an end view of an intake air cooler in a first embodiment of the invention, in which the intake air flows in countercurrent in the turbocharging stages.
Figures 3, 4, 5:
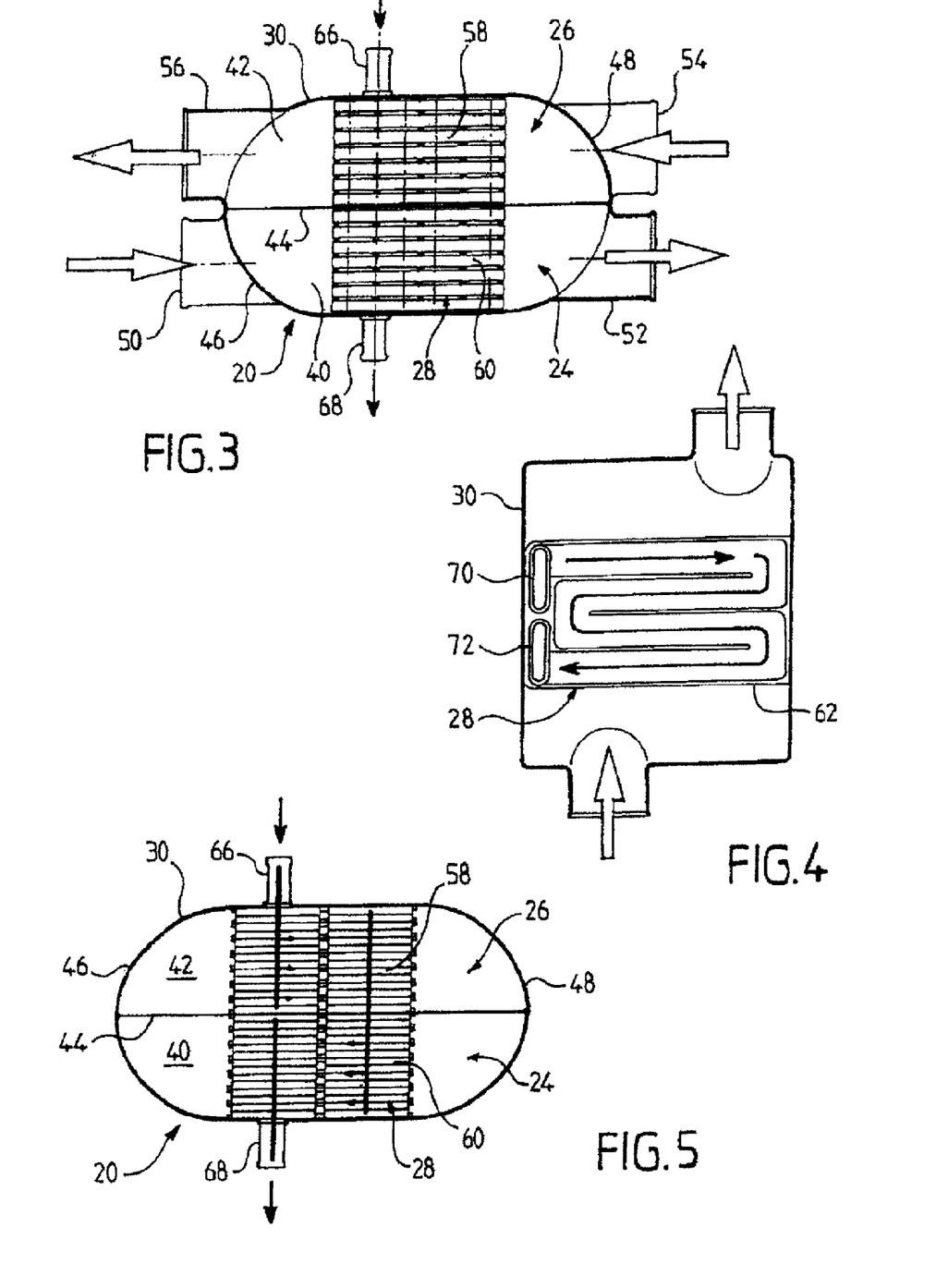
FIG. 3 is a cross section along III-III in FIG. 2.
FIG. 4 is a cross section along IV-IV in FIG. 2.
FIG. 5 is a cross section along V-V in FIG. 2.

Reference may now be made to FIGS. 2 to 5 to describe the cooler 20 in a first embodiment. The first cooling stage 24 and second cooling stage 26 respectively comprise a first conduit 40 and a second conduit 42 separated by a partition 44 (FIGS. 3 and 5). In the example, the first conduit 40 is placed below the second conduit 42 and the partition 44 extends in a generally horizontal plane. The housing 30 has an elongated shape and comprises two opposite ends 46 and 48. The first conduit 40 comprises an inlet 50 and an outlet 52 respectively formed at the end 46 and the end 48. The second conduit 42 comprises an inlet 54 and an outlet 56 respectively formed at the end 48 and the end 46 (FIG. 3). In consequence, the inlet and outlet of the first conduit are respectively opposite the inlet and outlet of the second conduit, so that the intake air flows in the conduits (hence in the cooling stages) in opposite directions, that is, counter currently, as shown by the arrows in FIG. 3. The abovementioned inlets and outlets are defined here by nozzles issuing from the housing.

The heat exchanger bundle 28 comprises a first part 58 and a second part 60 accommodated respectively in the second conduit 42 and the first conduit 40 and separated by the partition 44 (FIGS. 3 and 5). This partition 44 may be formed by the housing 30 and/or the bundle 28. In the example, the partition 44 is fixed, so that the two conduits 40 and 42 are permanently separated from one another, without any possibility of mutual communication.

As may be seen in FIGS. 2 to 5, the bundle 28 is formed of a stack of plates 62 placed in pairs and corrugated inserts 64 (the inserts can be seen in FIG. 2). The plates 62 bound flow streams for a cooling liquid traversing the bundle, these streams alternating with intake air flow channels, the latter being formed between the corrugations of the inserts. The bundle 28 is connected to an inlet nozzle 66 and to an outlet nozzle 68 (FIGS. 2, 3 and 5) for circulating the cooling liquid, the latter normally consisting of the engine coolant.

As may be seen in FIG. 5, the bundle 28 is arranged so that the cooling liquid flows in succession in the two parts of the bundle, here first in the part 60 and then in the part 60 as shown by the arrows in FIG. 5.

FIG. 4 shows the structure of a standard plate 62 comprising an inlet 70 and an outlet 72 and partitions for enabling the cooling liquid to define a flow path having at least one U-shape, here the form of two Us, the flow always taking place between two contiguous plates. The fluid flows in such a way as to flow in the opposite direction to the air flow direction, both in the first part and in the second part of the bundle (see the arrows in FIG. 4).

Figure 6:
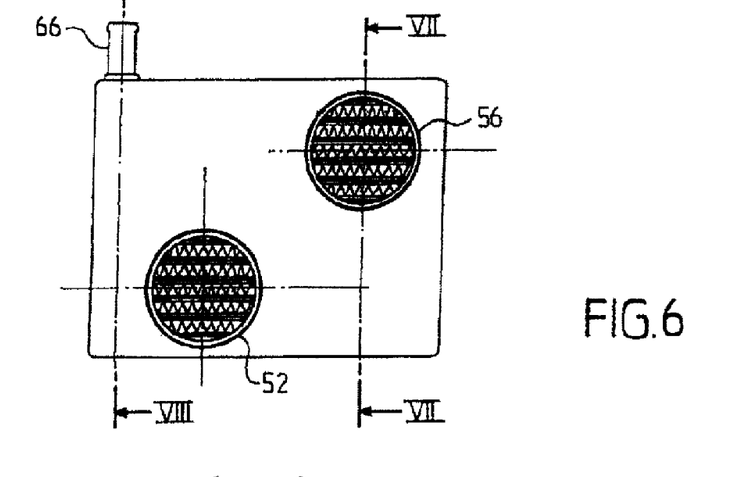
FIG. 6 is an end view of an intake air cooler according to a second embodiment of the invention, in which the intake air flows in the same direction in the turbocharging stages.
Figure 7:
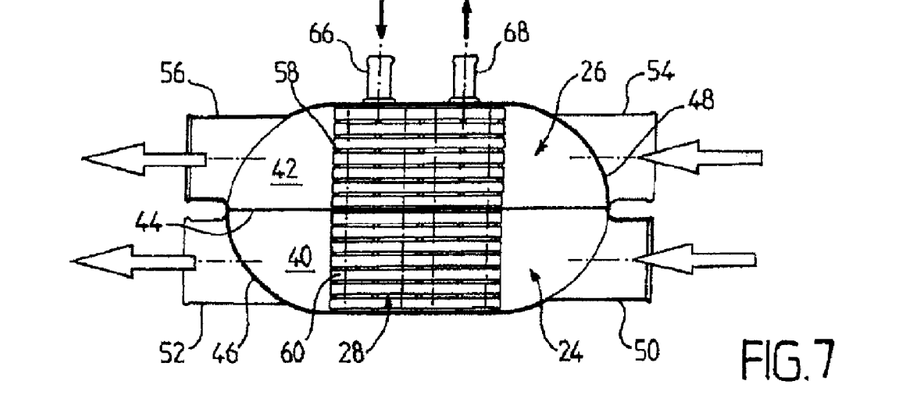
FIG. 7 is a cross section along VII-VII in FIG. 6.
Figure 8:
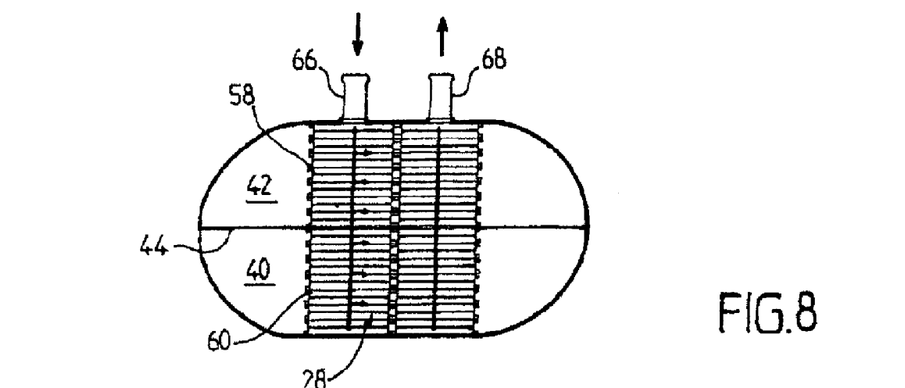
FIG. 8 is a cross section along VIII-VIII in FIG. 6.

Reference can now be made to FIGS. 6 to 8, which show a second embodiment of the invention, which essentially differs from the embodiment in FIGS. 2 to 5 by virtue of the fact that the inlet 50 and the outlet 52 of the first conduit 40 are respectively on the same side as the inlet 54 and the outlet 56 of the second conduit 42. In other words, the inlets 50 and 54 are on the side of the end 48, while the outlets 52 and 56 are on the side of the end 46, so that the intake air flows in the same direction, (that is cocurrently) in the two conduits (FIG. 7). In the example, the nozzles 66 and 68 of the bundle are located on the same side. The bundle is arranged so that the cooling liquid flows simultaneously in the first and second part of the bundle, as may be seen from the arrows in FIG. 8.

In the two preceding embodiments, the partition 44 is fixed, so that the two cooling stages are permanently separated from one another, without any possibility of communication.

Figure 9:
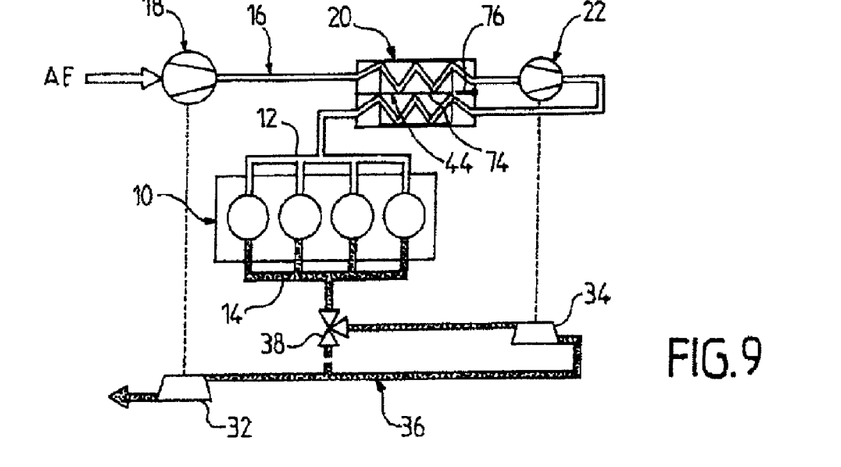
FIG. 9 schematically shows an internal combustion engine whereof the intake circuit comprises an intake air cooler of which the partition comprises a mobile part, for an operating mode in which the two compressors are active.
Figure 10:
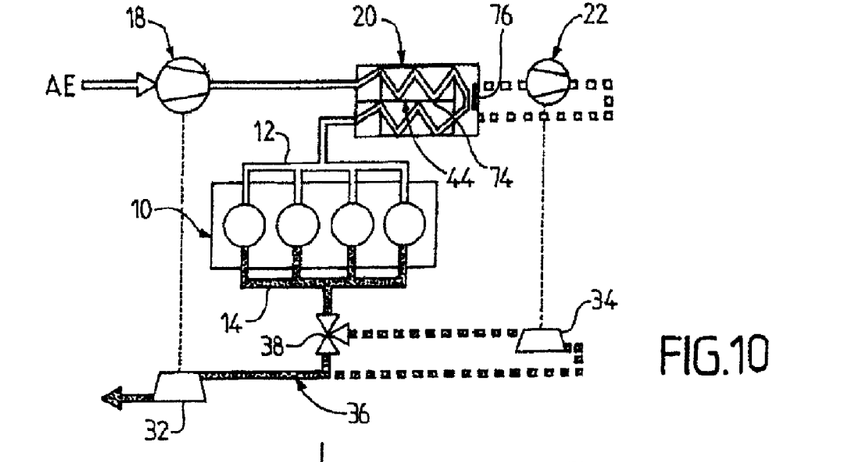
FIG. 10 shows a similar view to FIG. 9 for another operating mode in which only one of the two compressors is active.
Figure 11:
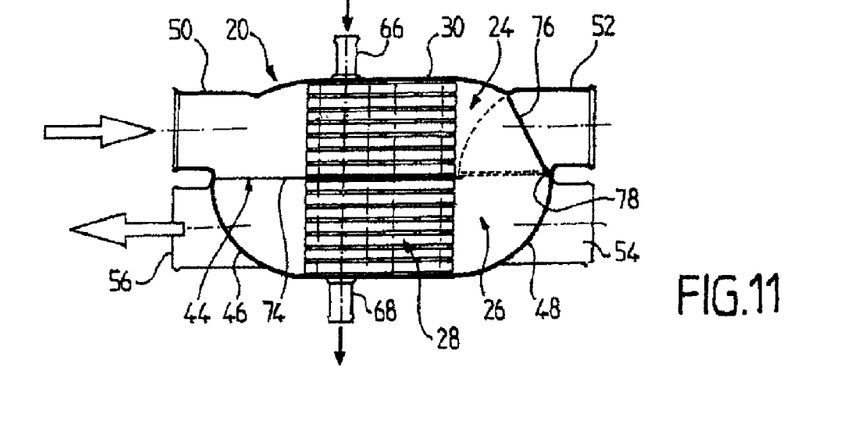
FIG. 11 is a cross section of the housing of the intake air cooler of the circuit in FIGS. 9 and 10 showing the mobile part of the partition.

Reference can now be made to FIGS. 9 to 11, which show another embodiment, similar to those in FIGS. 2 to 5, in which the respective air inlets 50 and 54 of the first conduit 40 and of the second conduit 42 are placed at opposite ends of the heat exchanger housing, so that the intake air flows in countercurrent in the conduits 40 and 42. Furthermore, the partition 44 of the cooler comprises a fixed part 74 and a mobile part 76, the latter being made in the form of a pivoting flap movable between a first position (FIG. 9) in which the conduits 40 and 42 cannot communicate, and a second position (FIG. 10) in which the two conduits can communicate mutually.

The mobile part 76 is located at one of the ends of the housing 30, here the end 48. In the configuration in FIG. 9, the intake air passes in succession through the compressor 18, the first cooling stage 24, the compressor 22 and the second cooling stage 26. The compressors 18 and 22 are active, their respective turbines 23 and 34 being driven by the exhaust gases.

On the contrary, in the case of FIG. 10, the intake air passes in succession through the compressor 18, the first stage 24 and the second stage 26 before reaching the intake manifold 12 of the engine, the compressor 22 being inactive. Only the turbine 32 of the compressor 18 is driven by the exhaust gases.

FIG. 11 shows the structure of the mobile part 76 in the form of a flap pivoting about an axis 78. The mobile part 76 is shown by broken lines in the first position (stages 24 and 26 isolated) and by solid lines in the second position (stages 24 and 26 communicating mutually).

Figure 12:
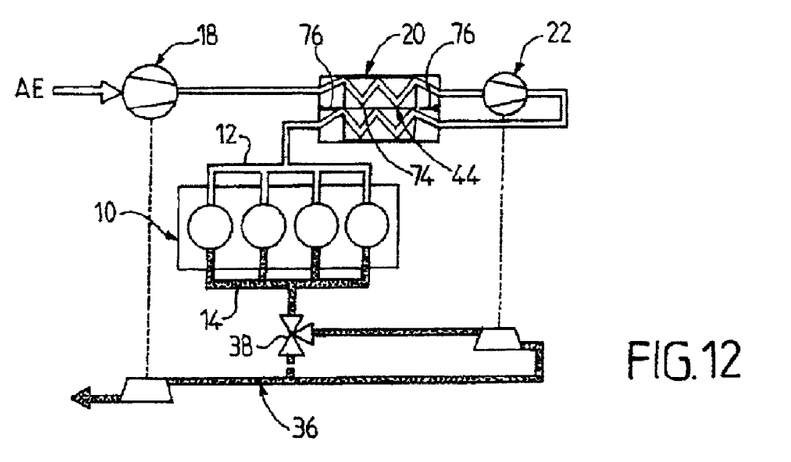
FIG. 12 schematically shows an internal combustion engine with its intake air circuit comprising an intake air cooler according to the invention in another embodiment in which the partition comprises two mobile parts, the circuit being shown in an operating mode in which the two compressors are active.
Figure 13:
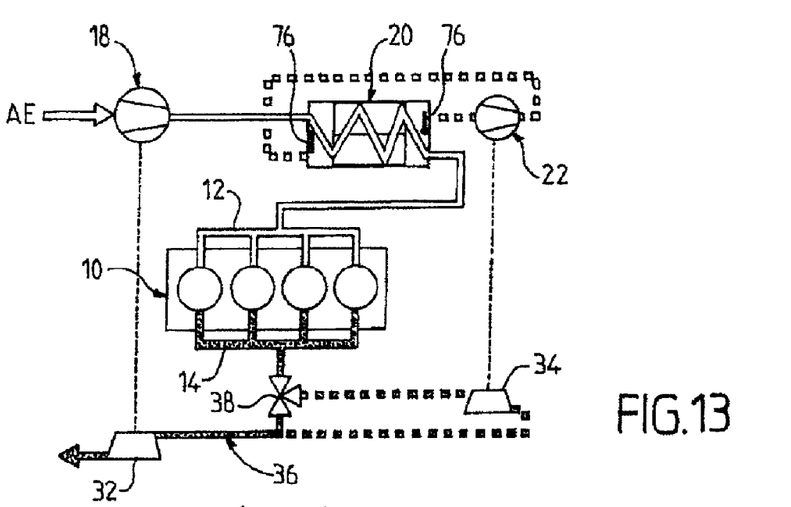
FIG. 13 is a similar view to FIG. 12 in an operating mode in which only one of the two compressors is active.
Figure 14:
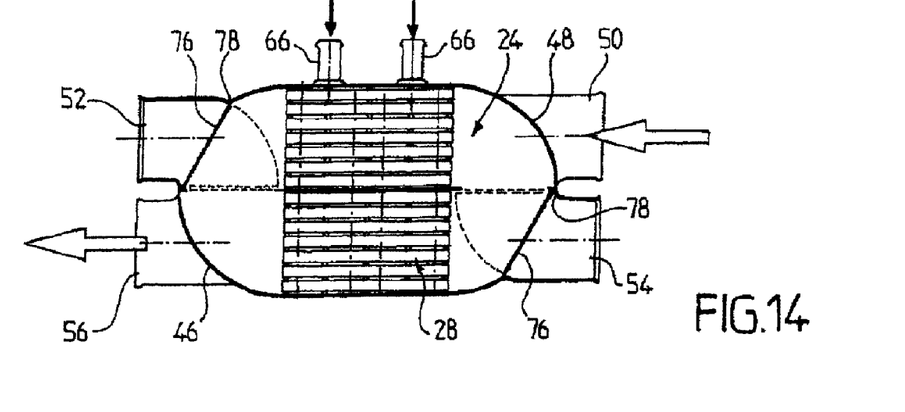
FIG. 14 is a cross section of the intake air cooler of FIGS. 12 and 13 showing the two mobile parts of the partition.

Reference can now be made to FIGS. 12 to 14, which show another alternative embodiment in which the partition comprises a central fixed part 74 and two mobile parts 76 placed respectively at the two ends of the housing. In the position in FIG. 12, the two cooling stages 24 and 26 are isolated and the circuit operates in the manner described previously with reference to FIG. 9. On the contrary, in the position in FIG. 13, the two mobile parts 76 make the two stages of the cooler communicate in a similar manner to the circuit in FIG. 10. In this latter case, it may be observed that the respective air inlets 50 and 54 of the first conduit 40 and second conduit 42 are placed at the same end of the heat exchanger housing. FIG. 14 shows the two positions of the mobile parts 76, respectively by broken lines and solid lines.

The invention thereby serves to group the two cooling stages in a single heat exchanger housing sharing the same heat exchanger bundle, thereby procuring the advantages mentioned previously.

The invention is not limited to the embodiments described above and extends to other alternatives. In particular, the heat exchanger bundle is not limited to a plate and corrugated insert structure, and could be formed from a tube bundle.

Furthermore, it could be provided for the cooling stages of the heat exchanger to be traversed by air issuing from two independent circuits such as, for example, two different turbocharging loops.

It is also possible to integrate the housing of the cooler directly in the engine intake plenum chamber.

The invention claimed is:

1. An intake air cooler for a dual-stage turbocharged internal combustion engine, characterized in that it comprises a first cooling stage (24) and a second cooling stage (26) traversed by intake air and grouped together in a single heat exchanger housing (30) and sharing a common heat exchanger bundle (28), accommodated in the heat exchanger housing (30) and traversed by a cooling liquid;
the first cooling stage (24) and the second cooling stage (26) respectively comprising a first conduit (40) and a second conduit (42) separated by a partition (44) and each having an inlet (50; 54) and an outlet (52; 56) for the intake air and wherein the heat exchanger bundle (28) comprises a first part (58) and a second part (60) accommodated respectively in the first conduit (40) and the second conduit (42);
wherein the partition (44) comprises a fixed part (74) and at least one mobile part (76) movable between a first position in which the first conduit (40) and the second conduit (42) are isolated and a second position in which the first conduit (40) and the second conduit (42) communicate.

2. The intake air cooler as claimed in claim 1, characterized in that the inlet (50) and the outlet (52) of the first conduit (40) are respectively opposite the inlet (54) and the outlet (56) of the second conduit (42) so that the intake air flows therein in opposite directions, and in that the heat exchanger bundle (28) is arranged so that the cooling liquid flows in succession in the first part (58) and the second part (60) of the bundle.

3. The intake air cooler as claimed in claim 2, characterized in that the heat exchanger bundle (28) is arranged so that the cooling liquid flows in the opposite direction to the intake air both in the first part (58) and in the second part (60) of the heat exchanger bundle (28).

4. The intake air cooler as claimed in claim 3, characterized in that the partition (44) is formed by the housing (30) and/or the bundle (28).

5. The intake air cooler as claimed in claim 1, characterized in that the inlet (50) and the outlet (52) of the first conduit (40) are respectively on the same side as the inlet (54) and the outlet (56) of the second conduit (42), so that the intake air flows therein in the same direction, and in that the heat exchanger bundle (28) is arranged so that the cooling liquid flows simultaneously in the first part (58) and the second part (60) of the heat exchanger bundle (28).

6. The intake air cooler as claimed in claim 5, characterized in that the heat exchanger bundle (28) is arranged so that the cooling liquid flows in the opposite direction to the intake air both in the first part (58) and in the second part (60) of the heat exchanger bundle (28).

7. The intake air cooler as claimed in claim 5, characterized in that the partition (44) is formed by the housing (30) and/or the bundle (28).

8. The intake air cooler as claimed in claim 1, characterized in that the heat exchanger bundle (28) comprises a stack of plates (62) and corrugated inserts (64) bounding cooling liquid flow streams alternating with intake air flow channels.

9. The intake air cooler as claimed in claim 8, characterized in that the cooling liquid flow streams, each formed between two contiguous plates (62), bound a flow path having at least one U-shape.

10. The intake air cooler as claimed in claim 1, characterized in that the partition (44) is formed by the housing (30) and/or the bundle (28).

11. The intake air cooler as claimed in claim 10, characterized in that the partition (44) is a fixed partition.

12. The intake air cooler as claimed in claim 10, characterized in that the partition (44) comprises a fixed part (74) and at least one mobile part (76) movable between a first position in which the first conduit (40) and the second conduit (42) are isolated and a second position in which the first conduit (40) and the second conduit (42) communicate.

13. The intake air cooler as claimed in claim 1, characterized in that the partition (44) is a fixed partition.

14. The intake air cooler as claimed in claim 1, characterized in that the respective air inlets (50; 54) of the first conduit (40) and the second conduit (42) are placed at opposite ends of the heat exchanger housing, and in that the partition comprises a single mobile part (76) located at one of the ends of the heat exchanger housing.

15. The intake air cooler as claimed in claim 1, characterized in that the respective air inlets (50; 54) of the first conduit (40) and the second conduit (42) are placed at the same end of the heat exchanger housing, and in that the partition comprises two mobile parts (76) located respectively at the two ends of the heat exchanger housing.

16. The intake air cooler as claimed in claim 1, characterized in that the mobile part (76) is a pivoting flap.

17. An intake air circuit for a dual-stage turbocharged internal combustion engine, comprising a low pressure upstream compressor (18) and a high pressure downstream compressor (22), characterized in that it further comprises an intake air cooler (20) according to claim 1, whereof the first cooling stage (24) is inserted between the upstream compressor and the downstream compressor, while the second cooling stage (26) is connected at the outlet of the downstream compressor.

18. The intake air circuit as claimed in claim 17, in which the intake air cooler (20) is equipped with a partition having at least one mobile part (76) movable between a first position which isolates and a second position which enables communication, characterized in that, in the first position, the intake air is passing in succession through the upstream compressor (18), the first cooling stage (24), the downstream compressor (22), then the second cooling stage (26), while, in the second position, the intake air is passing in succession through the upstream compressor (18), the first cooling stage (24), then the second cooling stage (26), while circumventing the downstream compressor (22).

19. The intake air cooler as claimed in claim 1, characterized in that the heat exchanger bundle (28) comprises a stack of plates (62) and corrugated inserts (64) bounding cooling liquid flow streams alternating with intake air flow channels.

20. An intake air cooler for a dual-stage turbocharged internal combustion engine, characterized in that it comprises a first cooling stage (24) and a second cooling stage (26) traversed by intake air and grouped together in a single heat exchanger housing (30) and sharing a common heat exchanger bundle (28), accommodated in the heat exchanger housing (30) and traversed by a cooling liquid;

the first cooling stage (24) and the second cooling stage (26) respectively comprising a first conduit (40) and a second conduit (42) separated by a partition (44) and each having an inlet (50; 54) and an outlet (52; 56) for the intake air and wherein the heat exchanger bundle (28) comprises a first part (58) and a second part (60) accommodated respectively in the first conduit (40) and the second conduit (42);

wherein the partition (44) is formed by the housing (30) and/or the bundle (28)

wherein the partition (44) comprises a fixed part (74) and at least one mobile part (76) movable between a first position in which the first conduit (40) and the second conduit (42) are isolated and a second position in which the first conduit (40) and the second conduit (42) communicate.

21. An intake air circuit for a dual-stage turbocharged internal combustion engine, comprising a low pressure upstream compressor (18), a high pressure downstream compressor (22), and an intake air cooler (20), the air intake cooler comprising a first cooling stage (24) and a second cooling stage (26) traversed by intake air and grouped together in a single heat exchanger housing (30) and sharing a common heat exchanger bundle (28), accommodated in the heat exchanger housing (30) and traversed by a cooling liquid;

the first cooling stage (24) and the second cooling stage (26) respectively comprising a first conduit (40) and a second conduit (42) separated by a partition (44) and each having an inlet (50; 54) and an outlet (52; 56) for the intake air and wherein the heat exchanger bundle (28) comprises a first part (58) and a second part (60) accommodated respectively in the first conduit (40) and the second conduit (42);

wherein the intake air cooler (20) is equipped with a partition having at least one mobile part (76) movable between a first position which isolates and a second position which enables communication, characterized in that, in the first position, the intake air is passing in succession through the upstream compressor (18), the first cooling stage (24), the downstream compressor (22), then the second cooling stage (26), while, in the second position, the intake air is passing in succession through the upstream compressor (18), the first cooling stage (24), then the second cooling stage (26), while circumventing the downstream compressor (22); and wherein the first cooling stage (24) is inserted between the upstream compressor and the downstream compressor, while the second cooling stage (26) is connected at the outlet of the downstream compressor.

* * * * *

UNITED STATES PATENT AND TRADEMARK OFFICE
CERTIFICATE OF CORRECTION

| | | |
|---|---|---|
| PATENT NO. | : 8,186,159 B2 | |
| APPLICATION NO. | : 11/915811 | |
| DATED | : May 29, 2012 | |
| INVENTOR(S) | : Carlos Martins et al. | |

It is certified that error appears in the above-identified patent and that said Letters Patent is hereby corrected as shown below:

Column 6, line 38, after "claimed in," delete "claim 3," and insert therein -- claim 2, --.

Signed and Sealed this
Eighteenth Day of December, 2012

David J. Kappos
*Director of the United States Patent and Trademark Office*